_United States Patent Office_ 3,143,838
Patented Aug. 11, 1964

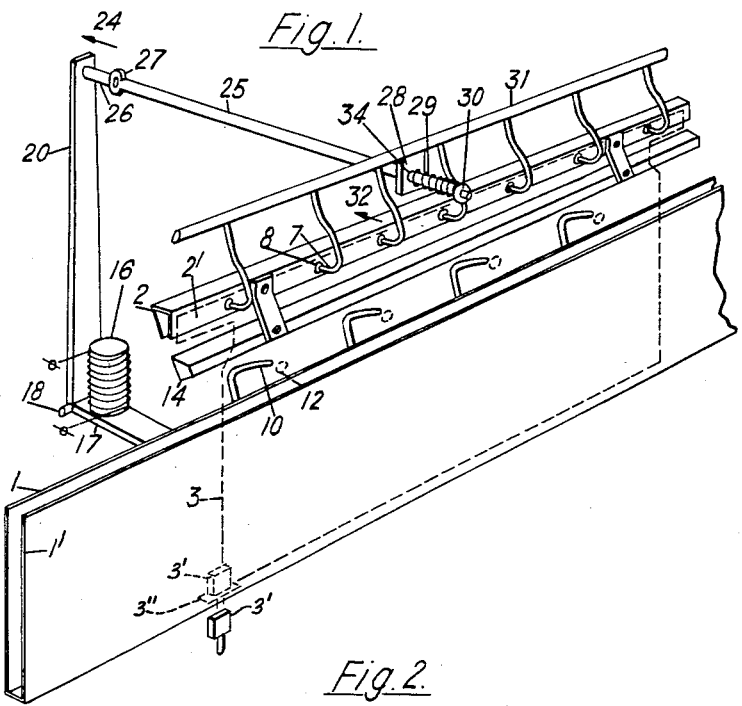
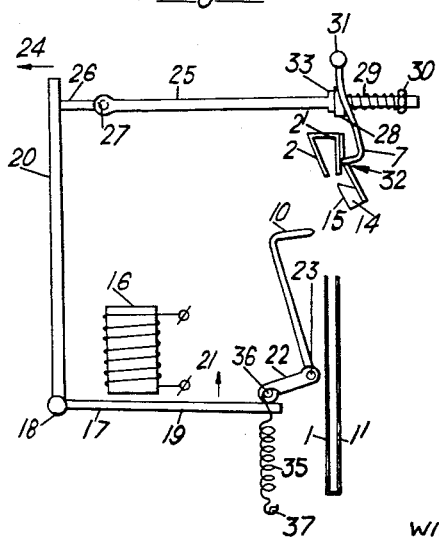

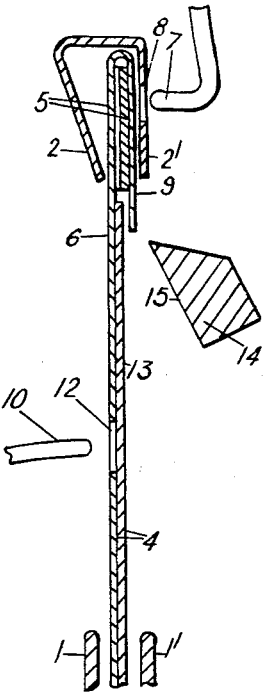
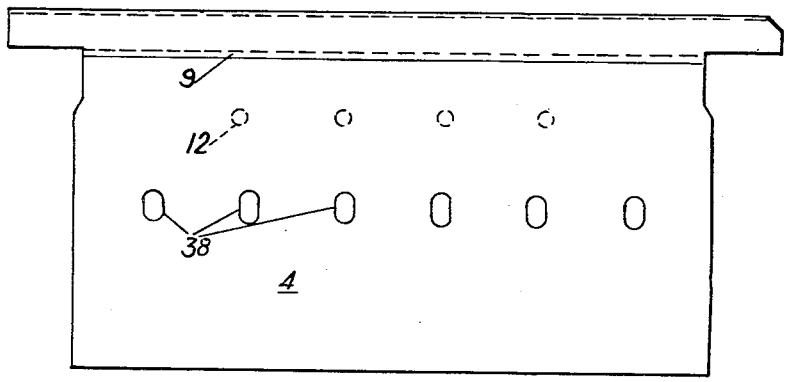

3,143,838
EDGE CLOSURE MECHANISM FOR A
DOCUMENT CARRIER
Willy Hortense Prosper Pouliart, Antwerp, Belgium,
assignor to International Standard Electric, New
York, N.Y., a corporation of Delaware
Filed July 12, 1961, Ser. No. 123,585
Claims priority, application Belgium July 15, 1960
6 Claims. (Cl. 53—376)

The invention relates to an edge closure mechanism for a document carrier one wall of which is higher than the other and which has a folded edge-part which constitutes as well a reinforcement as an edge behind which the upper edge of the less higher wall is located, said mechanism including a guide wherein said document carrier may be displaced, and means to stop and position said document carrier in a well determined position of said guide.

A document carrier of the type mentioned above is described in the Belgian Patent No. 544,840 (J. Young). It has to be noted that the edge of the reinforcement is an extension, on the whole length of the reinforcement, of the guard member 7 shown in said Patent 544,840, the aim of this extension being to maintain the document inside the document carrier during the automatic processing. The principle of the mechanism hereinafter described is the same as in the case of the processing of document carriers only provided with said guard member.

On the other hand several mechanisms, for the automatic processing of document carriers of this type and which include a guide and positioning means, are already known, e.g., from the Belgian Patent 569,306 (L. Andre, R. Van den Bossche).

In order to automatically execute the insertion of a document in such a document carrier in order that the document carrier with the document enclosed might be processed in other machines, the machine for executing this insertion operation has to be provided with a mechanism for introducing the upper edge of the less higher wall of the document carrier behind the edge of the higher wall.

An object of the present invention is to realize a mechanism for executing this operation.

According to a characteristic of the invention, said guide is provided at its upper part with a portion of a wall which is inclined with respect to the normal plane of said document carrier and which is situated at the back of said reinforcement of said document carrier when the latter is in a well determined position first pushers are arranged along said reinforcement and at the opposite side, with respect to said reinforcement, of said inclined part of said guide, said first pushers being able to execute a movement by which they apply said reinforcement against said inclined portion so that said edge of said higher wall is separated from said higher wall, a rod is mounted in parallel with and somewhat below the upper edge of said less higher wall, second pushers are arranged at the opposite side of said rod with respect to said document carrier and are able to pass through holes in said higher wall in order to push against said less higher wall and thus to arch the latter in a hollowed space of said guide below said rod in such a manner that the upper edge of said less higher wall becomes lower than said reinforcement of said higher wall and that afterwards, during the releasing of said second pushers, which has to take place before the releasing of said first pushers, the upper edge of said less higher wall will be introduced behind said edge of said higher wall due to the orientation which is given to said upper part by the presence and the position of said rod as well as due to the deviated position of said edge of said higher wall and finally said first pushers will be withdrawn to allow said reinforcement of the higher wall to resume its normal position.

The above mentioned and other objects and features of the invention will become more apparent and the invention itself will be best understood by referring to the following description of an embodiment of a mechanism according to the invention taken in conjunction with the accompanying drawings in which:

FIG. 1 represents a perspective schematic view of the described mechanism;

FIG. 2 is a schematic side view of the mechanism of FIG. 1;

FIGS. 3, 4, 5, 6 and 7 represent a side view of the successive phases of the closure operation of a document carrier executed by the mechanism of FIG. 1, and FIG. 8 is a front view of a document carrier adapted for this operation and of which a side view of the upper part is represented, e.g. at FIG. 7.

In a preferred embodiment, the mechanism according to the invention includes a guide constituted of two parts, the lower part being formed by the parallel walls 1 and 1' and the upper part being constituted by a wall 2', parallel to the plane of the document carrier, and a wall 2 forming a certain angle with this plane. The document carrier coming from a preceding mechanism, e.g. from the mechanism which introduces a document in this document carrier, is guided and transferred to the two parts of the guide described above by suitable and conventional not shown means. As soon as it arrives in the correct position where it has to be closed, it is stopped and correctly positioned by suitable means such as stop 3' (FIG. 1) which is controlled by well-known, not shown, control means which move stop 3' into operative relationship (dotted lines) with a document and out of operative relationship (solid lines) with a document via slot 3" at desired intervals. This position is shown in dotted lines 3 on FIG. 1.

Figure 3:
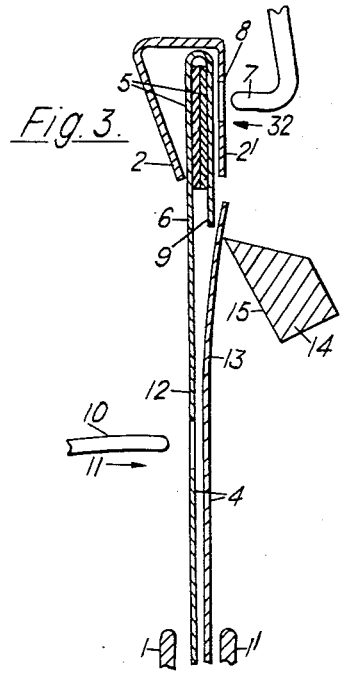
Figure 4:
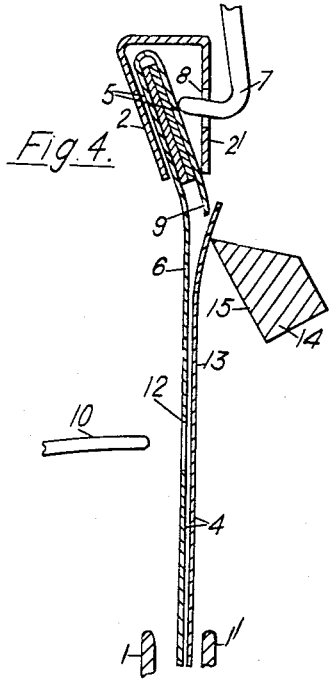
Figure 5:
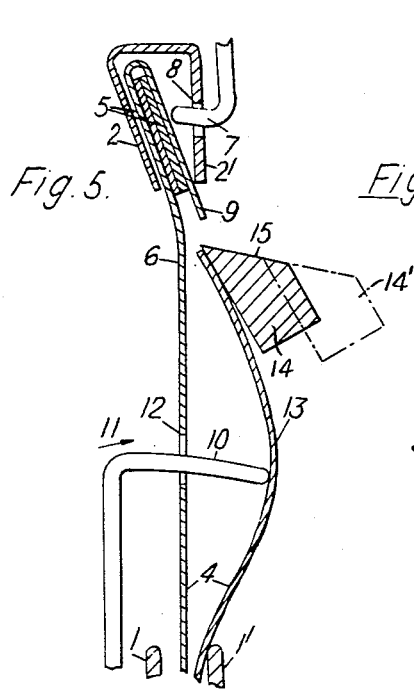
Figure 6:
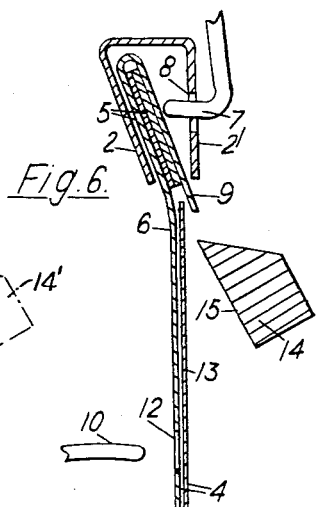

FIG. 3 gives a section view of the upper part of a document carrier 4 in the condition preceding the closure operation to be executed by the present mechanism and in FIG. 7 this upper part is represented in its closed condition. This document carrier is for instance of the type represented in FIG. 8 and the holes such as 38 are those which correspond to the holes designated by 6 in the Belgian Patent No. 569,306. When the document is in position 3, the reinforcement 5 of the upper edge of the highest wall 6 is situated between the walls 2 and 2'. When the closure action starts, pushers such as 7, passing through holes such as 8 in the wall 2', push against the reinforcement 5 in order to apply said edge of wall 6 against wall 2. In this way, the small edge 9 is more separated from the higher wall 6 as shown in FIGS. 4 and 5. Then, pushers such as 10 move in the direction of arrow 11, pass through holes such as 12 in the higher wall 6 of the document carrier and finally push against the less higher wall 13 to separate the latter from wall 6. However, the upper edge of wall 13 is retained in its displacement by rod 14 and due to this wall 13 is compelled to arch as shown in FIG. 5. It follows therefrom that the upper edge of wall 13 is inclined tangentially to the side 15 of rod 14. Then, the pushers such as 10 are withdrawn while pushers such as 7 continue to maintain the upper reinforced edge of wall 6 against wall 2. Due to its resiliency, wall 13 will resume its plane shape. At this moment, its upper edge glides behind edge 9. Then, pushers such as 7 are withdrawn at their turn and the upper edge of wall 6 returns by resiliency in the plane of the wall.

The movement of pushers such as 7 and 10 is controlled by a single electromagnet 16 the armature 17 of which is able to pivot around the axis 18 provided with two perpendicular arms 19 and 20. When the electro-magnet 16 is energized, arm 19 is displaced in the direction of arrow 21 and it pushes the end of arm 22 upwardly. This arm 22 is secured to a shaft 23 the ends of which are able to pivot in bearings not represented. To this shaft 23 are also secured a plurality of pushers such as 10. The movement of arm 19 in the direction of arrow 21 will thus displace pushers 10 in the direction of arrow 11. A restoring spring 35 is hooked on the one hand to point 36 at the end of arm 22, and on the other hand to a fixed point 37 of the frame.

Simultaneously arm 20 is displaced in the direction of arrow 24 and thus it moves shaft 25 by means of part 26 whereon shaft 25 is articulated in 27. During its displacement in the direction of the arrow 24 the shaft 25, which passes through a hole 34 in the lever 28, exerts a pressure on the latter lever 28 by means of limiting spring 29. One end of said spring 29 pushes against the middle of lever 28 while the other end is in contact with an adjustable screw 30 screwed on the end of shaft 25. A piece 33 (which may be constituted by a nut also screwed on shaft 25) is used as an abutment for lever 28, so that spring 29 may be brought in pre-constrained conditions in order to ensure a suitable action of pushers 7 as soon as the operation of the electro-magnet 16 starts. Lever 28 is secured to a shaft 31 the ends of which are able to pivot in bearings not shown. Pushers such as 7 are also fixed on shaft 31. Thus it is seen that the movement of shaft 25 in the direction of arrow 24 will first determine the displacement of pushers 7 in the direction of arrow 32 until the latter have applied the upper edge of wall 6 of the document carrier against the wall of guide 2, and that afterwards a supplementary displacement of shaft 25 compresses spring 29. During the displacement of pushers 7, the pushers 10 are displaced from the position represented on FIG. 3 until they come into contact with wall 13 of the document carrier. Then, during the compression movement of spring 29, the pushers 10 arch the wall 13 as previously explained. It is clearly seen that when the electromagnet 16 will release, the movements will be operated in exactly the reversed order as that described above.

It is to be remarked that the mechanism described above may also be used to open a document carrier, if the possibility exists to separate the rod 14 still more from the plane of the guide, so that at the moment of the withdrawal of the pushers 10, the edge of wall 13 is no longer introduced behind edge 9. Such a position of rod 14 is shown in dotted lines in FIG. 5 and referenced 14'. It is also possible in this case not to make use of the pushers 7. Thus, in FIG. 5, small edge 9 would be parallel to wall 2'. When such a mechanism is used to open document carriers in order to extract documents therefrom, it is useful to add a member thereto having as function to exert a slight downward traction on the document, in order to ensure that the latter will not remain caught behind the edge 9 at the moment of its extraction by the mechanism executing this operation. This may happen if, due to having been processed in various automatic processing machines, the document is raised in the document carrier to the point where its upper edge is behind edge 9.

This operation may for instance be executed by means of small rubber buffers acting on the document through holes 38, and actuated from the same movement source as pushers 10, by means of conventional suitable levers.

While the principles of the invention have been described above in connection with specific apparatus, it is to be clearly understood that this description is made only by way of example and not as a limitation on the scope of the invention.

I claim:

1. A document carrier control mechanism for a document carrier having one wall higher than another and having a folded edge extending beyond the edge on one side of the other wall, said mechanism including guide means for guiding said carrier, means for stopping and holding said carrier at a predetermined position along said guide, means passing through holes in said one wall to press said other wall outwardly so that the edge of said other wall is made lower than and is separated from said folded edge and means urging said folded edge away from said other wall so that upon release of said other wall said folded edge extends beyond the edge on the other side of said other wall.

2. An edge closure mechanism for a document carrier having one wall which is higher than the other and which has a folded edge forming a reinforcement spaced from said one wall and extending along the inside of the upper edge of the other wall, said mechanism including a guide wherein said document carrier may be displaced, and means to stop and position said document carrier at a predetermined position in said guide, including means for inclining said folded edge so as to be further separated from said one wall, means passing through holes in said one wall and bearing on said other wall so that said other wall is pressed outwardly and said upper edge thereof is displaced below said edge of said one wall, and means urging said displaced upper edge to be introduced at the inside of said edge of said one wall upon release of said other wall.

3. An edge closure mechanism for a document carrier one wall of which is higher than the other and which has a folded edge forming a reinforcement spaced from said one wall and extending along the inside of the upper edge of the other wall, said mechanism including a guide wherein said document carrier may be displaced, means to stop and position said document carrier at a predetermined position in said guide, said guide having a portion of a wall which is inclined with respect to the normal plane of said document carrier and which is positioned behind said folded edge, first pushers arranged along said folded edge and at the opposite side of said guide with respect to said inclined portion, means for causing said first pushers to press said folded edge against said inclined portion so that said folded edge is further separated from said one wall, a rod mounted parallel with and below the upper edge of said other wall, second pushers arranged on the same side of said document carrier as said inclined portion, means causing said second pushers to pass through holes in said one wall to press said other wall outwardly below said rod so that the upper edge of the other wall becomes lower than said folded edge of said one wall and is urged against said rod and upon release of said pushers said upper edge is introduced at the inside of said folded edge, and means causing said first pushers to thereafter be withdrawn to allow said folded edge to resume a stationary position.

4. An edge closure mechanism for a document carrier one wall of which is a higher than the other and which has a folded edge forming a reinforcement spaced from said one wall and engaging the outside of the upper edge of the other wall, said mechanism including a guide wherein said document carrier may be displaced, means to stop and position said document carrier in a predetermined position of said guide, and including pushers arranged at one side of the higher wall to pass through holes therein and push said other wall outwardly so that said upper edge is disengaged from said edge of said higher wall.

5. The device of claim 1 including electromagnetically operated linkage means to control the movement of said means to press said wall outwardly.

6. The device of claim 3 wherein said means for causing said pushers to press said walls includes electromagnetically operated linkage means.

References Cited in the file of this patent

UNITED STATES PATENTS

| | | |
|---|---|---|
| 822,616 | Liljeros | June 5, 1906 |
| 2,225,927 | Olson | Dec. 24, 1940 |
| 2,311,017 | Anderson | Feb. 16, 1943 |
| 2,689,079 | Timer | Sept. 14, 1954 |
| 2,884,183 | Frankel | Apr. 28, 1959 |